US011663234B2

(12) United States Patent
Falkinder et al.

(10) Patent No.: US 11,663,234 B2
(45) Date of Patent: May 30, 2023

(54) STORAGE OF A SMALL OBJECT REPRESENTATION IN A DEDUPLICATION SYSTEM

(71) Applicants: David Malcolm Falkinder, Bristol (GB); Richard Phillip Mayo, Bristol (GB)

(72) Inventors: David Malcolm Falkinder, Bristol (GB); Richard Phillip Mayo, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/302,109

(22) Filed: Apr. 23, 2021

(65) Prior Publication Data

US 2022/0342902 A1    Oct. 27, 2022

(51) Int. Cl.
*G06F 16/25*        (2019.01)
*G06F 16/23*        (2019.01)
*G06F 16/215*       (2019.01)
*G06F 16/22*        (2019.01)

(52) U.S. Cl.
CPC .......... *G06F 16/258* (2019.01); *G06F 16/215* (2019.01); *G06F 16/2219* (2019.01); *G06F 16/2379* (2019.01)

(58) Field of Classification Search
USPC ....................................................... 707/692
See application file for complete search history.

(56) References Cited

U.S. PATENT DOCUMENTS

| 5,239,647 | A   | 8/1993  | Anglin et al. |
|-----------|-----|---------|---------------|
| 8,572,055 | B1  | 10/2013 | Wu et al. |
| 8,719,286 | B1  | 5/2014  | Xing et al. |
| 8,799,238 | B2  | 8/2014  | Eshghi et al. |
| 8,959,067 | B1* | 2/2015  | Patiejunas ........... G06F 16/2379 707/696 |
| 9,613,043 | B2  | 4/2017  | Rao et al. |
| 9,633,056 | B2  | 4/2017  | Attarde |
| 9,696,913 | B1  | 7/2017  | Aron et al. |
| 10,365,974 | B2 | 7/2019  | Todd et al. |
| 10,698,941 | B2 | 6/2020  | Maybee et al. |
| 11,017,032 | B1* | 5/2021 | Karppanen ......... G06F 11/1402 |
| 11,182,256 | B2 | 11/2021 | Mayo et al. |

(Continued)

OTHER PUBLICATIONS

DeepAI, "What is the Jaccard Index?", available online at <https://deepai.org/machine-learning-glossary-and-terms/jaccard-index#:~:text=The Jaccard Index%2C also known,union of the sample sets>, Apr. 14, 2021, 3 pages.

(Continued)

*Primary Examiner* — Cam Linh T Nguyen
(74) *Attorney, Agent, or Firm* — Hewlett Packard Enterprise Patent Development

(57) ABSTRACT

Examples may include storage of a small object representation in a deduplication system. Examples may store the small object representation of an object in the deduplication system based on a determination that the object is smaller than a threshold size. In examples, the small object representation may include a direct reference from a top-level data structure to small object metadata in a bottom-level data structure of the small object representation.

20 Claims, 4 Drawing Sheets

(56) References Cited

U.S. PATENT DOCUMENTS

| | | | |
|---|---|---|---|
| 2010/0053162 A1* | 3/2010 | Dammertz | G06T 15/06 345/522 |
| 2018/0307425 A1 | 10/2018 | Blount | |
| 2019/0310968 A1 | 10/2019 | Attarde et al. | |
| 2022/0107921 A1 | 4/2022 | Mayo et al. | |

OTHER PUBLICATIONS

Wikipedia, "MinHash", available online at <https://en.wikipedia.org/w/index.php?title=MinHash&oldid=1018264865>, Apr. 17, 2021, 7 pages.

Cao, Z. et al.; "TDDFS: A Tier-Aware Data Deduplication-Based File System"; Feb. 2019; 10 pages.

Dagnaw, G. et al.; "dCACH: Content Aware Clustered and Hierarchical Distributed Deduplication"; Nov. 27, 2019; 31 pages.

Lee et al.; "TLSM: Tiered Log-Structured Merge-Tree Utilizing Non-Volatile Memory": Jun. 9, 2020; 15 pages; IEEE Access; vol. 8; <https://ieeexplore.ieee.org/stamp/stamp.jsp?tp=&arnumber=9056561>.

O'Neil, P., et al.; "The Log-Structured Merge-Tree (LSM-Tree)"; 1996; Acta Informatica 33; No. 4; 32 pages.

Vaidya, I. et al.; "An Improved De-Duplication Technique for Small Files In Hadoop"; Jul. 2017; 6 pages.

Wikipedia; "B-tree"; Mar. 4, 2021; 14 pages; printed from webpage: <https://en.wikipedia.org/w/index.php?title=B-tree&oldid=1010261854>.

Wikipedia; "inode"; Dec. 31, 2020; 5 pages; printed from webpage: <https://en.wikipedia.org/w/index.php?title=Inode&oldid=997443541>.

Wikipedia; "Log-structured merge-tree"; Dec, 8, 2020; 2 pages; printed from webpage: <https://en.wikipedia.org/w/index.php?title=Log-structured_merge-tree&oldid=993014830>.

* cited by examiner

STORAGE OF A SMALL OBJECT REPRESENTATION IN A DEDUPLICATION SYSTEM

BACKGROUND

A client computing device, such as a server or the like, may store data in a primary storage array, and may execute workloads against the data stored in the primary storage array. In some examples, for purposes such as redundancy and data protection, the data stored in the primary storage array may be backed up in a computing system separate from both the client computing device and the primary storage array. In some examples, this computing system may store data in a deduplicated form in order to store the data more compactly.

BRIEF DESCRIPTION OF THE DRAWINGS

The following detailed description references the drawings, wherein.

DETAILED DESCRIPTION

A client computing device, such as a server, storage array, etc., may back up data by storing the data in a computing system able to perform deduplication on the data in order to store the data in a deduplicated form that is more compact than a non-deduplicated form. Such a computing system able to perform such deduplication on data may be referred to herein as a deduplication system and may be implemented by a backup appliance. In examples described herein, a deduplication system may perform a deduplication process on an object, which is a collection of data in examples described herein. A deduplication system may receive objects as streams of data for deduplicated storage.

The individual objects provided to a deduplication system for deduplicated storage may be defined by the client system that provides the objects to the deduplication system for storage, so the provided objects may vary in size and type of content. For example, an object may represent a single file, an entire file system (or a portion thereof), one or more virtual volumes, or the like, and a given client may provide objects of various sizes to a deduplication system. However, it may be inefficient to store deduplicated representations of large and small objects in the same manner. To address these issues, examples described herein may utilize a large object representation for large objects in a deduplication system and a small object representation for small objects in the deduplication system.

Figure 1:
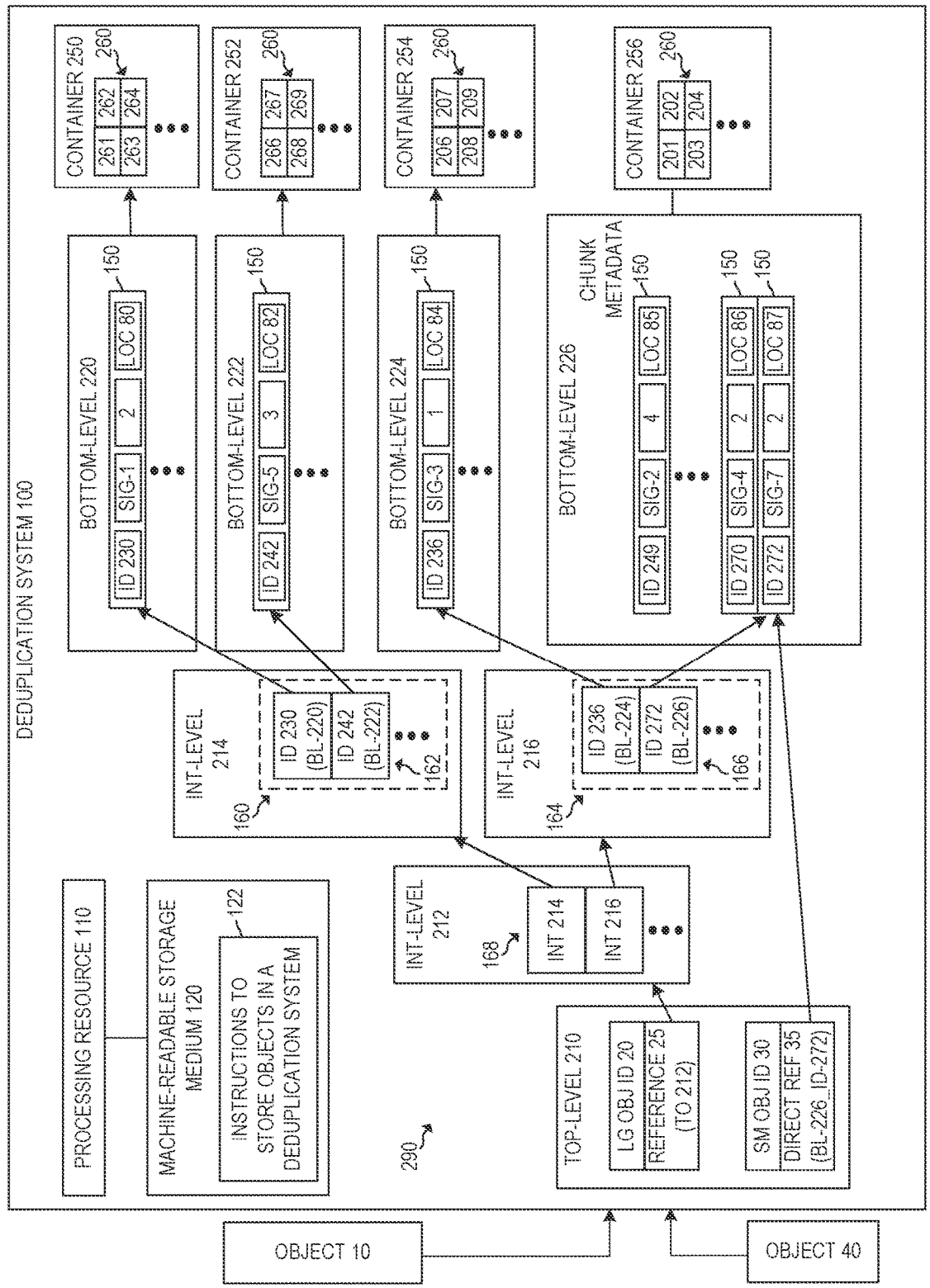
FIG. 1 is a block diagram of an example deduplication system to store a small object representation of an object.

FIG. 1 is a block diagram of an example deduplication system 100 to store a small object representation of an object. Deduplication system 100 may be implemented by a computing device such as at least one storage array, backup appliance, or the like. Deduplication system 100 may comprise at least one processing resource 110 and at least one machine-readable storage medium 120 comprising (e.g., encoded with) at least instructions 122 that are executable by the at least one processing resource 110 to implement functionalities described herein in relation to instructions 122. Functionalities described herein as performed by (or able to be performed by) deduplication system 100 may be implemented by processing resource(s) 110 executing instructions 122 of deduplication system 100, and may also be described as functionalities of instructions 122 (i.e., functionalities performed by processing resource(s) 110 when executing instructions 122).

Deduplication system 100 may store deduplicated representations of objects using a plurality of data structures. The plurality of data structures may include container data structure(s) (e.g., file(s)) that are to store fixed or variable sized chunks of the data content of the object(s). Container data structures may also be referred to as containers herein. In the example of FIG. 1, deduplication system 100 uses each of containers 250, 252, 254, and 256 to store respective chunks 260 of objects stored in deduplication system 100 via deduplicated representations. For example, container 250 may store at least chunks 261-264, container 252 may store at least chunks 261-269, container 254 may store at least chunks 206-209, and container 250 may store at least chunks 201-204. Although, for clarity, a relatively small number of chunks 260 are illustrated in each container in the figures, any container in the examples described herein may include more or fewer chunks.

Deduplication system 100 may store metadata for the deduplicated representations of objects in a hierarchy 290 of different types of data structures. The hierarchy 290 may include top-level data structures, bottom-level data structures, and intermediate-level data structures separate from and between top-level and bottom-level data structures in the hierarchy 290. In the example of FIG. 1, hierarchy 290 may include a top-level data structure 210, intermediate-level data structures 212, 214, and 216, and bottom-level data structures 220, 222, 224, and 226.

Each bottom-level data structure includes a respective instance of chunk metadata 150 for each chunk 260 in a corresponding container data structure. In the example of FIG. 1, bottom-level data structures 220, 222, 224, and 226 each include instances of chunk metadata 150 for chunks 260 of corresponding container data structures 250, 252, 254, and 256, respectively. A bottom-level data structure storing instance(s) of chunk metadata 150 may be referred to herein as a container index or a container index data structure.

Each instance of chunk metadata 150 is associated with a respective chunk 260 stored in one of the container data structures and includes metadata associated with the respective chunk. The metadata may include a chunk signature (representing the content of the associated chunk), a reference count for the associated chunk, and a location identifier indicating a storage location of the associated itself (e.g., a location within the container data structure in which it is stored). Chunk metadata 150 may also include a data identifier (e.g., an arrival number) that identifies that instance of chunk metadata 150 itself.

In the example of FIG. 1, bottom-level data structure 220 corresponds to container data structure 250 and contains a respective instance of chunk metadata 150 for each of the chunks 260 stored in container data structure 250. For example, bottom-level data structure 220 includes an instance of chunk metadata 150 (illustrated in FIG. 1) for chunk 261 of container 250. The chunk metadata 150 for chunk 261 includes a data identifier 230 (to identify this instance of chunk metadata 150 itself), a chunk signature SIG-1 for chunk 261, a reference count of 2 for chunk 261, and a location 80 indicating a location of chunk 261 (e.g., an offset within container data structure 250).

Also illustrated in FIG. 1, bottom-level data structure 222, associated with container 252, includes chunk metadata 150 for chunk 266 of container 252. Chunk metadata 150 for chunk 266 includes data identifier 242, chunk signature SIG-5, a reference count of 3, and location 82. Bottom-level data structure 224, associated with container 254, includes chunk metadata 150 for chunk 206 of container 254. Chunk metadata 150 for chunk 206 includes data identifier 236, chunk signature SIG-3, a reference count of 1, and location 84. Also illustrated in FIG. 1 are several instances of chunk metadata 150 included in bottom-level data structure 226 associated with container 256, including: chunk metadata 150 for chunk 201 (including identifier 249, signature SIG-2, a reference count of 4, and location 85); chunk metadata 150 for chunk 203 (including identifier 270, signature SIG-4, a reference count of 2, and location 86); and chunk metadata 150 for chunk 204 (including identifier 272, signature SIG-7, a reference count of "7", and location 87). Although, for clarity, a relatively small number of instances of chunk metadata 150 are illustrated in each bottom-level data structure in the figures, any bottom-level data structure in the examples described herein may include more instances of chunk metadata 150.

Intermediate-level data structures of hierarchy 290, when present, are separate from and between top-level and bottom-level data structures in hierarchy 290. A top-level data structure 210 in hierarchy 290 may store one or more object identifiers (e.g., 20, 30), each associated with a respective object stored (in a deduplicated representation) in deduplication system 100. In some examples, a client system of deduplication system 100 may use the object identifier(s) to access the respective object(s) stored in deduplication system 100. A top-level data structure 210 may map each of the object identifiers stored therein to a respective metadata reference. A mapped metadata reference may point to (e.g., indicate a location of, etc.) other metadata of a deduplicated representation of an object stored in the deduplication system 100. In such examples, for each object identifier stored in the top-level data structure 210, the object identifier is associated with a given object and the top-level data structure 210 maps the object identifier to a metadata reference to other metadata of a deduplicated representation of the given object.

In the example of FIG. 1, top-level data structure 210 (which may be referred to as a catalog or catalog data structure 210) may store an object identifier (ID) 20 (e.g., a key) associated with a client-provided object 10 that is stored in a deduplicated representation in deduplication system 100. Top-level data structure 210 maps object identifier 20 (associated with object 10) to a reference 25, which is a reference to other metadata (intermediate-level data structure 212 in the example of FIG. 1) of the deduplicated representation of the object 10. Although, for clarity, a relatively small number of mappings between object identifier and references are illustrated in the top-level data structure 210 in the figures, any top-level data structure in the examples described herein may include more or fewer such mappings.

As noted above, intermediate-level data structures of hierarchy 290, when present, are separate from and between top-level and bottom-level data structures in hierarchy 290. Each intermediate-level data structure may be referenced by (e.g., pointed to by) a top-level data structure or another (higher) intermediate-level data structure in the hierarchy 290. Each intermediate-level data structure may reference (e.g., point to) another (lower) intermediate-level data structure in the hierarchy 290 or one or more bottom-level data structures. In the hierarchy 290, a first data structure may be considered higher than a second data structure that the first data structure points to or references. In the hierarchy 290, a first data structure may be considered lower than a second data structure that points to or references the first data structure.

In the example of FIG. 1, top-level data structure 210 may reference intermediate-level data structure 212, which in turn may reference intermediate-level data structures 214 and 216. Intermediate-level data structure 214 may reference bottom-level data structures 220 and 222 (e.g., instances of chunk metadata 150 therein) and intermediate-level data structure 216 may reference bottom-level data structures 224 and 226 (e.g., instances of chunk metadata 150 therein). In some examples, a deduplicated representation of a client-provided object may include one or more manifests that collectively indicate an order of chunks (stored in the deduplication system) that would, if combined in that order, form a reconstituted (or re-hydrated) version of the client-provided object that is stored in the deduplicated representation in the deduplication system. The order of the chunks indicated by a manifest may be referred to herein as a reconstruction order. In examples herein, a manifest may represent an entire object or a portion of an object (in which case, multiple manifests for multiple portions of an object collectively represent the entire object).

In examples described herein, an intermediate-level data structure may comprise a manifest for an object (or portion of that object) stored in the deduplication system. The manifest for the object (or portion thereof) may represent the collection of chunks that make up the object (or portion thereof) via references to chunk metadata associated with each of those chunks. A manifest for the object (or portion thereof) may represent a reconstruction order for the chunks that make up the object (or portion thereof). For example, a manifest may include the reconstruction order for the chunks by storing the references to the chunk metadata for those chunks in an order that represents the reconstruction order for the chunks (or in any other suitable manner).

In the example of FIG. 1, intermediate-level data structure 214 comprises a manifest 160 including direct references 162 to chunk metadata 150 in bottom-level data structure(s) (e.g., 220, 222, etc.). Manifest 160 may store the references 162 to chunk metadata 150 for a first portion of object 10 associated with large object ID 20. Manifest 160 may store the references 162 in a reconstruction order for the first portion of object 10. References 162 include a reference to chunk metadata 150 having ID 230 and stored in bottom-level data structure 220 ("BL-220"), and a reference to chunk metadata 150 having ID 242 and stored in bottom-level data structure 222 ("BL-222").

Intermediate-level data structure 216 comprises a manifest 164 including direct references 166 to chunk metadata 150 in bottom-level data structure(s) (e.g., 224, 226, etc.). Manifest 164 may store the references 166 to chunk metadata 150 for a second portion of object 10 associated with large object ID 20. Manifest 164 may store the references 166 in a reconstruction order for the second portion of object 10. References 166 include a reference to chunk metadata 150 having ID 236 and stored in bottom-level data structure 224 ("BL-224"), and a reference to chunk metadata 150 having ID 272 and stored in bottom-level data structure 226

("BL-226"). Because a manifest may represent a reconstruction order for at least a portion of an object, it may also be referred to as a portion index herein. Although, for clarity, a relatively small number of references are illustrated in the manifests shown in the figures, any manifest in the examples described herein may include more or fewer references.

In examples described herein, a deduplicated representation of an object may include the data and metadata of deduplication system 100 that useable to reconstruct a full (i.e., non-deduplicated or re-hydrated) version of the object. In the example of FIG. 1, the deduplicated representation for object 10 may include top-level data structure 210, intermediate-level data structures 212, 214, and 216, and bottom-level data structures 220, 222, 224, and 226 (which form a tree like structure for accessing each of the appropriate chunks 260 for object 10), and various chunks 260 stored in the containers of deduplication system 100 and that are referenced by the metadata of the deduplicated representation. In examples described herein, data, metadata, and data structures of deduplication system 100 may be part of multiple different deduplicated representations of objects stored in deduplication system 100.

In such examples, to access chunks of object 10 (e.g., for full reconstruction, selective access of data of object 10, etc.), deduplication system 100 may start from the large object ID 20 associated with object 10. Based on the mapping of large object ID 20 to reference 25 in data structure 210, deduplication system 100 may follow reference 25 to intermediate-level data structure 212. From there, deduplication system 100 may follow each of the references 168 from intermediate-level data structure 212 to intermediate-level data structures 214, 216, etc. Although, for clarity, a relatively small number of references 168 are illustrated in intermediate-level data structure 212 shown in the figures, an intermediate-level data structure in the examples described herein may include more or fewer such references.

Deduplication system 100 may use the respective manifests 160, 164, etc., included in each of intermediate-level data structures 214, 216, etc., to access the appropriate chunks 260 of object 10 (and reconstruct them in the reconstruction order as appropriate). Using manifest 160, for example, deduplication system 100 may use a first reference 162 to access chunk metadata 150 having ID 230 in bottom-level data structure 220. From that chunk metadata 150, deduplication system 100 may access chunk 261 in location 80 of container 250. Deduplication system 100 may use a second reference 162 to access chunk metadata 150 having ID 242 in bottom-level data structure 220 and, from that chunk metadata 150, access chunk 266 in location 82 of container 252. In the same way, deduplication system 100 may access each chunk referenced by manifest 160 via each of references 162.

Deduplication system 100 may similarly access chunks 260 based on additional manifests of intermediate-level data structures referenced by intermediate-level data structure 212 (i.e., manifests for object 10). For example, deduplication system 100 may use each of the references 166 of manifest 164 to access instances of chunk metadata 150, including using a first reference 166 to access chunk metadata 150 having ID 236 in bottom-level data structure 224 and, from that chunk metadata 150, access chunk 206 in location 84 of container 254. Deduplication system 100 may use a second reference 166 to access chunk metadata 150 having ID 272 in bottom-level data structure 226 and, from that chunk metadata 150, access chunk 204 in location 85 of container 256.

The hierarchy 290 of data structures, as described above, may be efficient for representation of large objects (e.g., on the order of GBs to TBs, or more). For example, the tree-like structure of hierarchy 290 of data structures may make accessing any given piece of data of a large object more efficient than it would be with metadata organized in a flat or monolithic structure. For example, the hierarchy 290 may require much less processing than a flatter metadata layout, as traversing the tree-like structure of hierarchy 290 will often take less processing than searching a flatter metadata layout.

The hierarchy 290 of data structures may also enable more efficient use of memory resources when accessing the data compared to a flatter metadata layout. For example, with a hierarchy 290 of data structures, a deduplication system 100 may limit the amount of metadata that will be loaded into memory to perform a particular access. For example, the amount of metadata loaded into memory may be limited to the data structures in the hierarchy 290 that are relevant to locating the requested data, avoiding loading other data structures of the hierarchy 290 (e.g., manifest data structures) that are not used for a particular access request. In contrast, a flat metadata organization, or even a flatter metadata organization using larger individual data structure (s), may use more memory and involve greater amounts of input/output (I/O) and latency to pull more data into memory to access the requested data.

However, while a hierarchy of data structures may be beneficial for large objects, it may be quite inefficient for small objects. For example, the above-described hierarchy of data structures may be inefficient when the object size is near a minimum block size able to be used by the deduplication system (e.g., due to a file system limit, storage device limit, or the like). As an example, for an object that is the size of a single such block (e.g., 4 KB), using two levels of intermediate-level data structures in a hierarchy 290 may take up twice as much space as the actual content of the data represented (i.e., 4 KB in this example). While the object being represented in that example is 4 KB, each of the two intermediate levels of metadata for the object may each use at least an additional 4 KB and thereby take up twice as much space (e.g., 2×4 KB=8 KB) as the actual content of the data represented (i.e., 4 KB in this example). Similarly, accessing chunks of the small object in such an example may involve retrieving each of the intermediate-level data structures used for that object into memory in order to access the small object, increasing memory usage and latency to retrieve chunks of the small object.

To address these issues, examples described herein may store a small object representation of an object based on a determination that the object is smaller than a threshold size. The small object representation of the given object may comprise a direct reference from a top-level data structure to small object metadata in a bottom-level data structure of the small object representation, where the direct reference omits any intermediate-level data structures separate from and between the top-level and the bottom-level data structures of the small object representation.

In this manner, examples described herein may be able to store small objects in a deduplication system while omitting intermediate-level data structures that, if used, might significantly increase the size of the deduplication representation of the small object (relative to the small size of the object itself), and also increase the memory usage and latency of accessing the deduplication representation of the small object. Storing a small object via a small object representation, as described herein, may also enable the small object to be stored in a deduplication system efficiently and in a manner that allows its data to become part of a deduplication domain so that it may be deduplicated against other (previously stored) data, so that other (later stored) data may be deduplicated against the data of the small object, or both.

Examples described herein enable flexibility in the deduplication system such that large and small object may be treated differently so that both may be handled efficiently. Such flexibility may be beneficial, as a deduplication system may not be able to define the size and contents of the object provided to it for storage. As noted above, the size and content of objects provided to deduplication system for storage may be determined by the client system providing the objects for storage, and client systems may provide small objects for storage in a deduplication system, particularly as usage of backup, long-term, or secondary storage resources change.

In the past, a deduplication system (e.g., a deduplicating backup appliance) may have been used frequently to store very large objects representing the data of an entire machine or file system. In such cases, the data backed up may have often been left in the backup appliance unused until it was restored in its entirety (if at all). However, such usage of a backup appliance as a "cold tier" of storage is being supplemented by usage of backup appliances in a manner that is more like the usage of a primary storage tier. This may include models in which workloads are run on backup appliances, such as starting a virtual machine on a backup appliance (from the data stored there) before moving it over to another system for further operations, for example. As backup appliances are treated more like a primary storage tier, there may be a greater demand for random access of data stored on the backup appliance, and as such it may be desirable to reduce the amount of I/O and the latency of I/O for such random access requests. As described above, examples described herein may reduce I/O and the corresponding I/O latency for small objects by omitting the intermediate-level data structures (and thus the retrieval of those data structures into memory to interact with the small object data).

In addition, such changes in the usage of backup appliances may also change the types of objects that clients store to backup appliances. For example, there are several scenarios in which backup appliances may receive small object from client systems, and scenarios in which those small objects may be subject to frequent changes. For example, a client system may utilize a very small lock file in its operations, and it may present that small file as an independent object for backup. Also, metadata about a backup may be stored as a separate file by a client system, and the client system may present that file as an independent object for storage in the backup appliance.

Before further discussion of small object representations, an example deduplication process is described below in relation to deduplication system 100 of FIG. 1 to provide additional context. Deduplication system 100 may have one or more deduplication domains, each being a particular collection of data against which a provided object may be deduplicated. In the example of FIG. 1, a portion of a single deduplication domain is illustrated. Although, for simplicity, abbreviated versions of the deduplication domain and the data, metadata, and data structures of the deduplication domain are illustrated in FIG. 1, deduplication system 100 may include more or fewer of each type of data structure of hierarchy 290, more or fewer container data structures, and more or fewer instances of the types of data contained by each.

In an example illustrated in FIG. 1, deduplication system 100 may receive content of an object 10 (e.g., as a data stream) to store in a deduplicated representation in deduplication system 100. Deduplication system 100 may divide the data of object 10 into a plurality of portions of object 10, and may perform aspects of the deduplication process (e.g., matching, etc.) on each portion of object 10 a portion at a time. In other examples, object 10 may be treated as a single portion containing the entirety of the content of object 10 (e.g., depending on the size of object 10).

Deduplication system 100 may process each portion of object 10 separately, including processes of dividing (or chunking) the portion into fixed length (e.g., 4 KB) or variable length sections referred to herein as chunks, performing a matching process to identify duplicate chunks of the portion (i.e., chunks having content identical to that of other chunk(s) already stored in the deduplication domain), storing one (full or compressed) copy of each chunk not identified as being a duplicate of an already-stored chunk, and, for each duplicate chunk, storing a reference (e.g., a pointer) to a stored copy of the chunk without storing the duplicate chunk again. In this manner, a deduplication process may often avoid storing duplicates of the same chunk in a deduplication system. In some examples, a reference to the stored copy of the chunk may be a reference to an instance of chunk metadata 150 for the chunk (i.e., an indirect reference to the chunk). By performing this process for each portion of the object 10, deduplication system 100 may store a deduplicated representation of object 10.

Deduplication system 100 may perform the matching process on a portion after the portion has been divided into chunks. The matching process may include determining respective chunk signatures for each of the chunks (i.e., one per chunk). Chunk signatures are indicated in figures herein using reference symbols of the format "SIG-N" where "N" stands for a number. In examples described herein, a chunk signature may be data representative of the content of a chunk derived by applying a signature function to the chunk. In some examples, the signature function may be a hash function, and the chunk signature may be a hash (or hash value) of the chunk generated by applying the hash function to the chunk. Any suitable hash function may be used to generate the chunk signature. In other examples, any other suitable type of signature function may be used in place of a hash function to generate a chunk signature (e.g., a function to generate a suitable type of fingerprint).

In the example of FIG. 1, in a matching process for a portion of object 10, deduplication system 100 may, for each chunk of the portion, compare the chunk signature of the chunk against the chunk signatures present in at least one of the bottom-level (or container index) data structures (e.g., 220, 222, 224, 226, etc.) of the deduplication domain to determine whether any chunk signature in the bottom-level data structure(s) searched matches the chunk signature of the given chunk. When a chunk signature matching the chunk signature of the given chunk is found in the bottom-level data structure(s) that were searched, deduplication system 100 may determine that a match for the given chunk is found and may not store the present copy (i.e., the duplicate copy) of the chunk in the deduplication domain. Instead, deduplication system 100 may represent the chunk by adding a reference to the matching, previously-stored chunk to a manifest for the present portion. That reference may comprise a reference to the instance of chunk metadata 150 associated with the matching, previously-stored chunk.

For example, in a matching process during ingest of object 10 of FIG. 1, deduplication system 100 may determine a chunk signature of "SIG-1" for a given chunk, search selected bottom-level data structures for a matching chunk signature, and find matching chunk signature "SIG-1" in an instance of chunk metadata 150 of bottom-level data structure 220, thereby determining that a match is found for the given chunk (e.g., chunk 261). In this example, deduplication system 100 may not add the given chunk to a container of the deduplication domain (as that would be storing a duplicate of chunk 261). Instead, deduplication system 100 may add a reference 162 to the instance of chunk metadata 150 having ID 230, and associated with chunk 261, to manifest 160 of data structure 214.

In instances when no chunk signature matching the chunk signature of a given chunk is found in the bottom-level data structure(s) that were searched, deduplication system 100 may determine that no match for the given chunk is found and may add the given chunk to a container to store it in the deduplication domain. Deduplication system 100 may also add an instance of chunk metadata 150 for the given chunk to a bottom-level data structure corresponding to the container to which the given chunk is added. In such examples, a reference to the instance of chunk metadata 150 for the given chunk is added to a manifest for the portion of object 10 being processed.

As an example, consider a time before chunk 204 and its associated metadata has been stored in the deduplication domain illustrated in FIG. 1, and consider that deduplication system 100 performs a matching process on a given chunk 204 during ingest of object 10. In such an example, deduplication system 100 may determine a chunk signature "SIG-7" for the given chunk 204, search one or more bottom-level (container index) data structures (e.g., 220, 222, 224, 226, etc.) and determine that no matching chunk signature "SIG-7" is present in them. In this manner, deduplication system 100 may determine that no matching chunk signature has been found in the deduplication domain. Based on that determination, deduplication system 100 may add chunk 204 to container data structure 256, add a corresponding instance of chunk metadata 150 having ID 272 to bottom-level data structure 226 (which corresponds to container 256), and add to manifest 164 a reference 166 to chunk metadata 150 having ID 272. In such examples, deduplication system 100 may use the chunk signatures stored in bottom-level data structures to determine whether a given chunk of a portion being ingested is a duplicate of a chunk already stored in a container data structure of the present deduplication domain, and if so, avoid storing a duplicate copy of that chunk in the deduplication domain.

Figure 2:
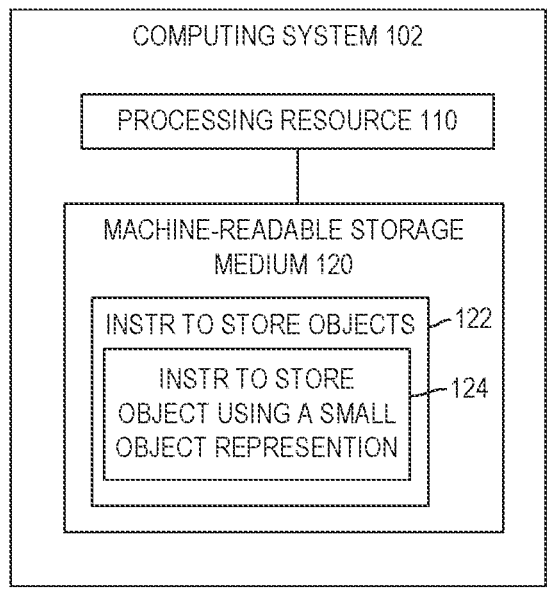
FIG. 2 is a block diagram of an example computing device comprising instructions executable to store a small object representation of an object.

Examples are described below in relation to FIGS. 2 and 3, and with continued reference to FIG. 1. FIG. 2 is a block diagram of an example computing system 102 comprising instructions 122 executable to store a small object representation of an object. In the example of FIG. 2, example computing system 102 comprises at least one processing resource 110 and at least one machine-readable storage medium 120 storing instructions 122 to store objects. Instructions 122 may include instructions 124 to store an object using a small object representation. Computing system 102 may be implemented by at least one computing device and may comprise one or more server, storage array, backup appliance, or the like (or a combination thereof). Computing system 102 may implement a deduplication system, such as the deduplication system 100 of FIG. 1.

Processing resource(s) 110, machine-readable storage medium 120, and instructions 122 of FIG. 2 are the same as those components of system 100 illustrated in FIG. 1. Functionalities of instructions 124 may also be described as functionalities of instructions 122 herein, as instructions 122 comprise instructions 124.

Figure 3:
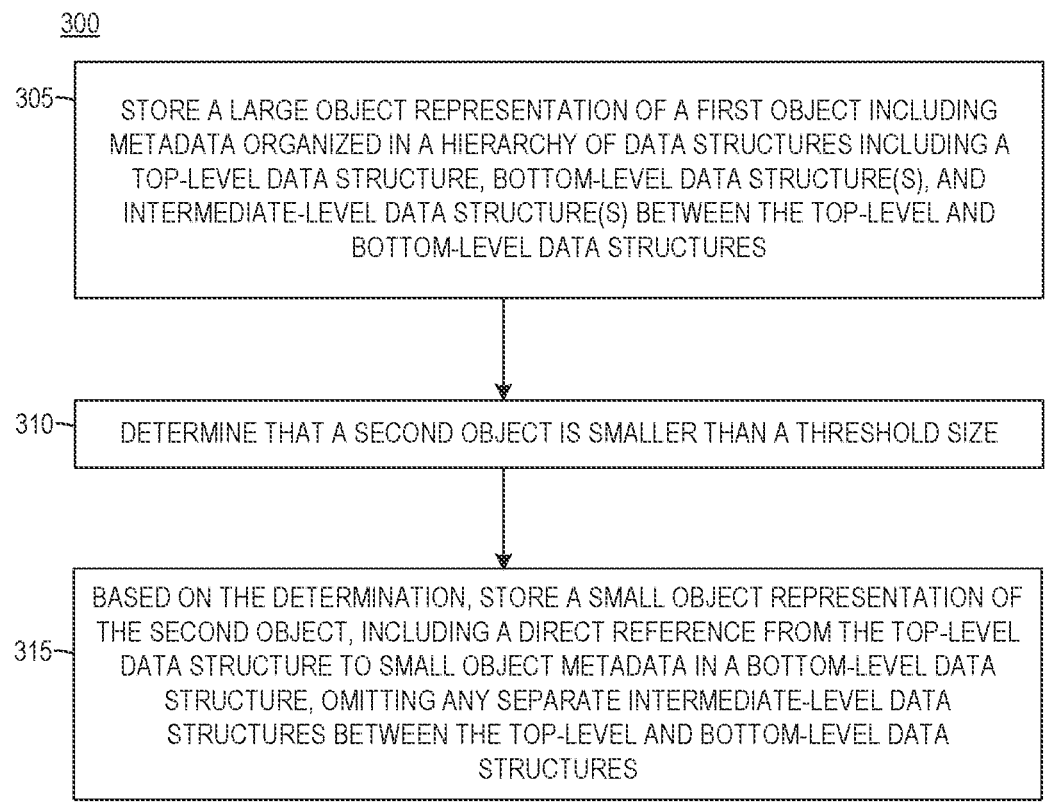
FIG. 3 is a flowchart of an example method that includes storing a small object representation of an object.

FIG. 3 is a flowchart of an example method 300 that includes storing a small object representation of an object. Although execution of method 300 is described below with reference to deduplication system 100 of FIG. 1 and computing system 102 of FIG. 2, other computing systems suitable for the execution of method 300 may be utilized, and implementation of method 300 is not limited to such examples. Although the flowchart of FIG. 3 shows a specific order of performance of certain functionalities, the method represented by the is not limited to that order. For example, functionalities shown in succession may be performed in a different order, may be executed concurrently or with partial concurrence, or a combination thereof.

Referring to FIGS. 2 and 3, at 305 of method 300, instructions 122 of computing system 102 may (when executed by at least one processing resource 110), store, in computing system 102, a large object representation of a first object that is greater than a threshold size. At 310, instructions 124 may determine that a second object is smaller than the threshold size. At 315, based on the determination at 310, instructions 124 may store a small object representation of the second object in computing system 102. The threshold size may be any suitable size in accordance with the examples described herein. As an example, the threshold size may be 10 MB, such that instructions 122 may determine that an object smaller than 10 MB is less than the threshold size (and may be treated as a small object and stored via a small object representation), and instructions 122 may determine that an object greater than or equal to 10 MB is greater than or equal to threshold size (and may be treated as a large object and stored via a large object representation). Instructions 122 may compare the size of an object to the threshold size based on the size of the object without deduplication (e.g., before deduplication, or the size the object would have when restored to an un-deduplicated or re-hydrated form). In other examples, the threshold size may be larger or smaller than 10 MB, may be a tunable parameter of computing system 102, and an appropriate threshold size may be empirically determined. In such examples, the determination of whether an object is less than (or greater than or equal to) the threshold size may be determined directly, by comparing a size of the object (without deduplication) to the threshold size. In other examples, the determination may be performed indirectly, such as based on the size of a manifest for the object in a deduplicated representation (since the size of such a manifest for an object is related to the size of the object without deduplication).

Examples are described in more detail with further reference to FIGS. 1 and 3. The functionalities described below in relation to instructions 122 are applicable to instructions 122 of both deduplication system 100 of FIG. 1 and computing system 102 of FIG. 2 (including functionalities of instructions 124, which are included in instructions 122). In some examples, computing system 102 of FIG. 2 may implement deduplication system 100 of FIG. 1.

Referring to FIGS. 1 and 3, instructions 122 may receive a first object 10 for storage in a deduplicated representation in deduplication system 100. Instructions 122 may receive object 10 as a stream of data, and may process object 10 in its entirety together or separate it into portions to be separately deduplicated (as described above). In the example of FIG. 1, instructions 122 may determine that first object 10 is greater than a threshold size, and based on that determination may, at 305 of method 300, store a large object representation of first object 10 in deduplication system 100. The large object representation of object 10 may comprise metadata organized in a hierarchy 290 of data structures including: a top-level data structure 210; bottom-level data structures 220, 222, 224, 226, etc.; and intermediate-level data structures 212, 214, 216, etc., separate from and between the top-level data structure 201 and the bottom-level data structures 220, 222, 224, 226, etc., in hierarchy 290.

As described above, instructions 122 may divide object 10 into chunks as part of a deduplication process for object 10, and perform the above-described matching process after which each of the bottom-level data structures (220, 222, 224, 226, etc.) of the large object representation of object 10 comprises an instance of chunk metadata 150 that includes a storage location (e.g., 80) for a respective chunk (e.g., 261) of object 10. Each instance of chunk metadata 150 of the large object representation of object 10 also includes an ID for the instance of chunk metadata 150 (e.g., ID 230), a chunk signature (e.g., SIG-1) for a respective chunk (e.g., chunk 261) of object 10, and a reference count (e.g., 2) for the respective chunk of object 10 (each as described above and in relation to FIG. 1).

In the example of FIG. 1, the large object representation of object 10 includes intermediate-level data structures 212, 214, 216, etc., which comprise a manifest representing a reconstruction order for the chunks of object 10. The reconstruction order may be maintained in the intermediate-level data structures via references to instances of chunk metadata 150 of the bottom-level data structures 220, 222, 224, 226, etc., of the large object representation of object 10.

In examples described herein, a plurality of intermediate-level data structures may collectively comprise a manifest by one of the intermediate-level data structures including the entire manifest, or by more than one of the intermediate-level data structures each including a manifest for a given portion of an object such that the manifests for the portions collectively form a manifest for the object as a whole. Additionally, some intermediate-level data structure(s) may not store any portion of a manifest. For example, intermediate-level data structures 214, 216, etc., may each include a manifest 160, 164, etc., for a respective portion of object 10, where the manifests for the respective portions of object 10 collectively form a manifest for object 10. Further, while intermediate-level data structure 212 is part of the plurality of intermediate-level data structures 212, 214, 216, etc. that comprise a manifest for object 10, intermediate-level data structure 212 does not include any manifest portion, as it is a higher-level data structure in hierarchy 290 that is above and points to the intermediate-level data structures that include the manifests of the portions of object 10.

In examples described herein, intermediate-level data structures are separate from and between the top-level and bottom-level data structures. For example, in FIG. 1, intermediate-level data structures 212, 214, and 216 are separate from and between top-level structure 210 and bottom-level data structures 220, 222, 224, 226, etc., in hierarchy 290. In examples described herein, an intermediate-level data structure is between a top-level data structure and a bottom-level data structure when, for example, a sequence of references from the top-level data structure to the bottom-level data structure passes through the intermediate-level data structure. For example, a sequence of references from top-level data structure 210 to bottom-level data structure 220 passes through intermediate-level data structure 212 to bottom-level data structure 220, including the following references: a reference 25 from top-level data structure 210 to intermediate-level data structure 212, a reference 168 from intermediate-level data structure 212 to intermediate-level data structure 214, and a reference 162 from intermediate-level data structure 214 to bottom-level data structure 220 (specifically to the instance of chunk metadata 150 with ID 230). In this example, intermediate-level data structure 214 is also between top-level data structure 210 and bottom-level data structure 220.

Another way that an intermediate-level data structure, when present, is considered to be between a top-level data structure and a bottom-level data structure is that the top-level data structure is above the intermediate-level data structure in the hierarchy and the bottom-level data structure is below the intermediate-level data structure in the hierarchy. For example, top-level data structure 210 is above intermediate-level data structure 212 (and intermediate-level data structures 214 and 216) in hierarchy 290 and the bottom-level data structure is below intermediate-level data structure 212 (and intermediate-level data structures 214 and 216) in hierarchy 290.

In examples described herein, intermediate-level data structures are separate from top-level data structures and bottom-level data structures (which are also separate from one another). In such examples, deduplication system may allocate separate units of storage space for each from top-level data structure, each intermediate-level data structure, and each bottom-level data structure. For example, a computing system such as deduplication system 100 may use a storage allocation strategy with a smallest allocation (or block) size (e.g., 4 KB or the like). In such examples, creation of any top-level, intermediate-level, or bottom-level data structure may include instructions 122 allocating storage space of at least the smallest allocation size for the data structure. The storage space may be allocated initially in volatile storage such as memory, or in non-volatile storage, or the like. Each such data structure may remain within the initially allocated space, or grow beyond that initial allocation size. In such examples, each top-level, intermediate-level, and bottom-level data structure may be managed as a separate unit of storage that may be managed separately from other such data structures. For example, each top-level, intermediate-level, and bottom-level data structure may be independently managed within deduplication system 100, such as being independently flushed from memory to persistent storage, independently retrieved from persistent storage into memory, or the like.

Referring again to FIGS. 1 and 3, instructions 122 may receive a second object 40 for storage in a deduplicated representation in deduplication system 100. Instructions 122 may receive object 40 as a stream of data, and may process object 40 in its entirety together or separate it into portions to be separately deduplicated (as described above). In such examples, instructions 122 may, at 310 of method 300, determine that object 40 is smaller than the threshold size. Based on that determination instructions 122 may, at 315 of method 300, store a small object representation of object 40 in deduplication system 100.

The small object representation of second object 40 may comprise a direct reference 35 from top-level data structure 210 to small object metadata in bottom-level data structure 226 of the small object representation. The direct reference 35 is direct in that it omits any intermediate-level data structures separate from and between the top-level data structure 210 (containing the direct reference 35) and the bottom-level data structure 226 of the small object representation that direct reference 35 references (e.g., points to). The bottom-level data structure 226 of the small object representation includes chunk metadata 150 for each chunk of the second object 40, including a respective storage location(s) (e.g., location 87) for each chunk (e.g., chunk 204) of the second object 40.

In examples described herein, small object metadata in a bottom-level data structure may be an instance of chunk metadata 150 (as in the example of FIG. 1) or a manifest stored in the bottom-level data structure (as in the examples of FIGS. 4 and 5, described below). In the example of FIG. 1, the content of second object 40 may be contained in a single chunk 204 of container 256, and chunk 204 may have been present before ingest of object 40 or may have been added during ingest of object 40. In such examples, the small object metadata of the small object representation includes the instance of chunk metadata 150 having ID 272 that is for the single chunk 204 of second object 40. In such examples, the direct reference 35 comprises a reference, stored in the top-level data structure 210, to the instance of chunk metadata 150 having ID 272 and that is for the single chunk 204 of the second object 40. That instance of chunk metadata 150 is stored in bottom-level data structure 226 of the small object representation. In such examples, the direct reference 35 comprises a reference, stored in the top-level data structure 210, and mapped to a small object identifier 30 associated with second object 40.

In the example of FIG. 1, during ingest of object 40, instructions 122 may determine that the content of second object 40 is small enough to be represented in deduplication system 100 by a single chunk. For example, second object 40 may be no larger than a chunk size (or a maximum chunk size) used by the deduplication system (e.g., 4 KB). Based on the determination that chunk 40 is small enough, instructions 122 may store, in top-level data structure 210, a reference 35 to the instance of chunk metadata 150 for the single chunk of the second object 40 (i.e., the instance of chunk metadata 150 having ID 272 that is for chunk 204).

Figure 4:
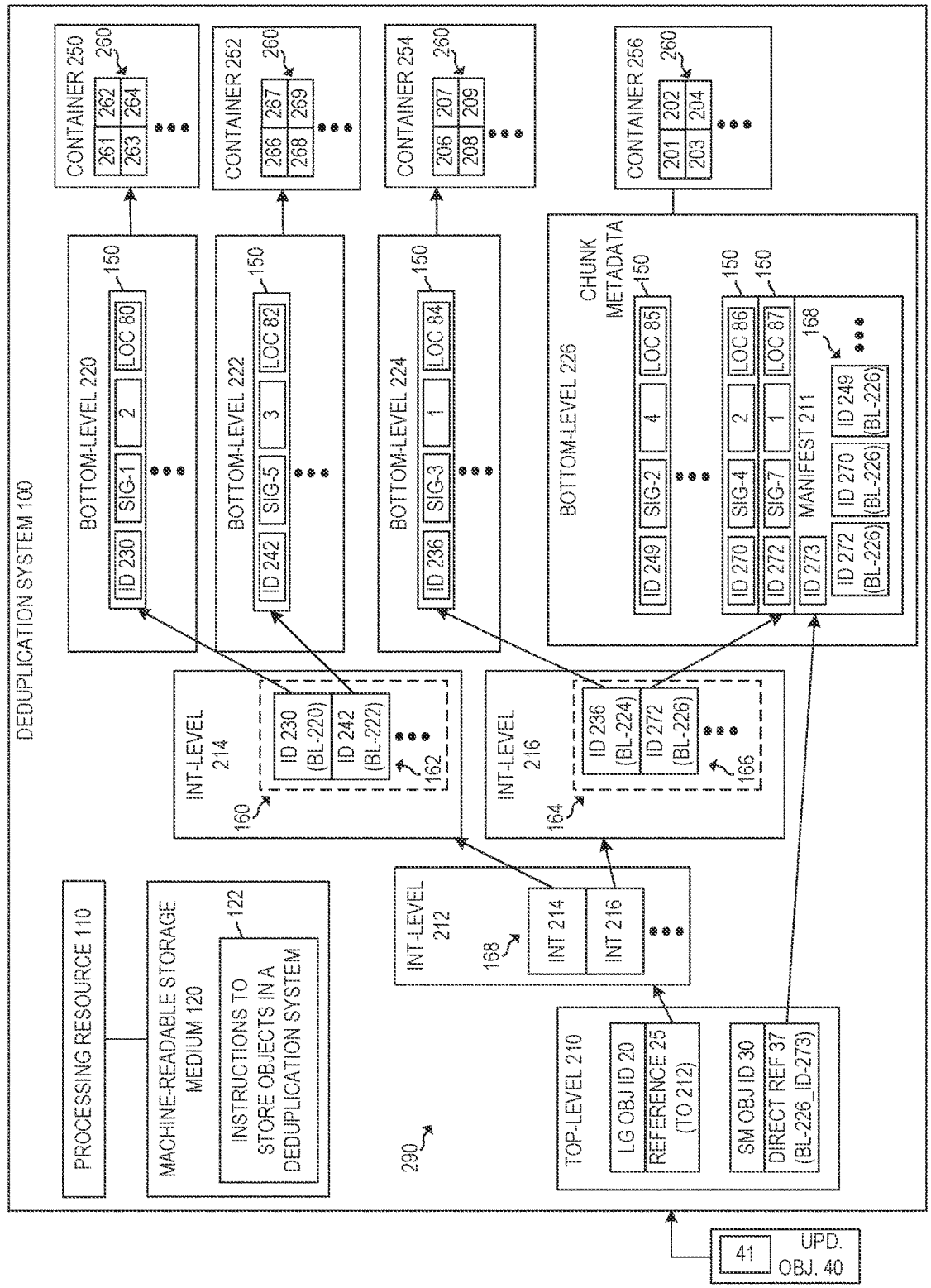
FIG. 4 is a block diagram of an example deduplication system in which a small object representation includes a manifest.
Figure 5:
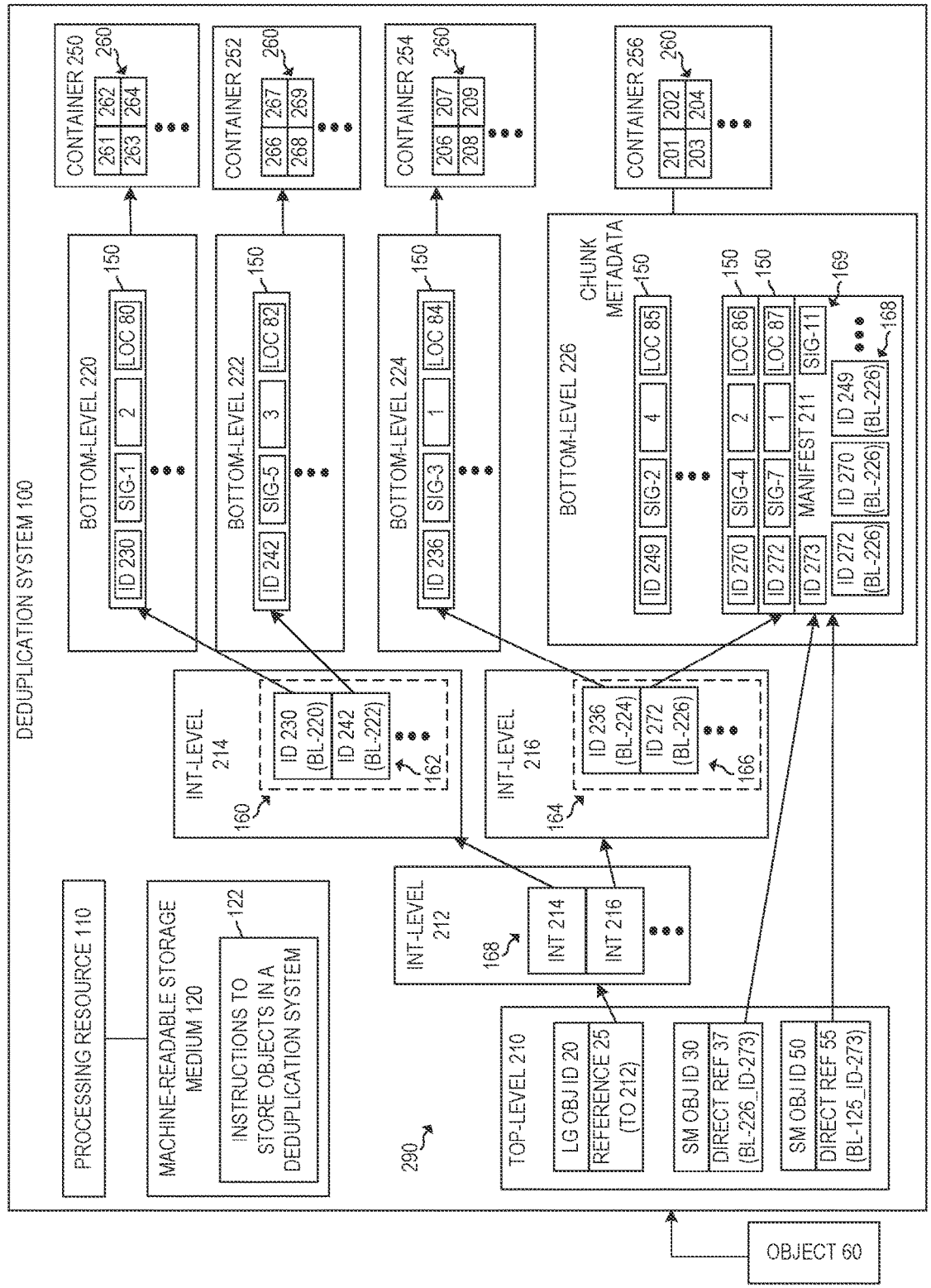
FIG. 5 is a block diagram of an example deduplication system to deduplicate manifests.

Further examples of small object representations are described herein in relation to FIGS. 4 and 5. FIG. 4 is a block diagram of an example deduplication system 100 in which a small object representation includes a manifest. The deduplication system 100 of FIG. 4 is the same as the deduplication system 100 of FIG. 1, although the example of FIG. 4 illustrates some different functionalities of deduplication system 100 than the example of FIG. 1.

As described above in relation to FIG. 1, a small object representation of a second object 40 may comprise a direct reference from top-level data structure 210 to small object metadata in bottom-level data structure 226 of the small object representation, and the small object metadata may be a manifest stored in the bottom-level data structure 226. In the example of FIG. 4, a small object representation of a second object 40 may include a direct reference 37 from top-level data structure 210 to a manifest 211 stored in bottom-level data structure 226. In some examples, the small object metadata may initially be an instance of chunk metadata 150 (as in the example of FIG. 1) and then transition to a manifest 211 as illustrated in FIG. 4. In other examples, the small object metadata may initially be a manifest such as manifest 211 as illustrated in FIG. 4.

An example in which deduplication system 100 transitions the small object metadata from an instance of chunk metadata to a manifest is described below in relation to FIGS. 1 and 4. In such examples, instructions 122 may first store, in deduplication system 100, a small object representation of second object 40 as described above in relation to FIG. 1 (including a direct reference 35 to an instance of chunk metadata 150 having ID 272). In some examples, after storing that small object representation of the second object 40, instructions 122 may receive an updated version of object 40 (see FIG. 4), that is larger than the initial version of object 40 of the example of FIG. 1. In such examples, instructions 122 may determine that additional content 41 of the updated version of object 40 is to be stored to the deduplicated representation of the second object 40 in deduplication system 100. In some examples, instructions 122 may determine that the content of the updated second object 40 with the additional content 41 is both too large to be stored in one chunk and smaller than the threshold size.

Based on that determination, instructions 122 may store, in bottom-level data structure 226 of the small object representation, a manifest 211 for the updated second object 40 with the additional content 41. In the example of FIG. 4, the content of the updated second object 40 is contained in a plurality of chunks 260, including chunks 201, 203, 204, etc., of container 256. Manifest 211 for the updated second object 40 represents, via references 168 to instances of chunk metadata 150, a reconstruction order of the plurality of chunks 260 containing the content of the updated second object 40, including the additional content 41. Manifest 211 comprises direct references 168 to instances of chunk metadata 150 in bottom-level data structure(s). In the example of FIG. 4, references 168 include a reference to chunk metadata 150 having ID 272 and stored in bottom-level data structure 226 ("BL-224"), a reference to chunk metadata 150 having ID 270 in data structure 226, and a reference to chunk metadata 150 having ID 249 in data structure 226. Chunk metadata 150 having ID 272 is associated with chunk 203, chunk metadata 150 having ID 270 is associated with chunk 204, and chunk metadata 150 having ID 249 is associated with chunk 201, in the example of FIG. 4.

In such an example of transitioning the small object metadata from an instance of chunk metadata 150 to a manifest, instructions 122 may modify the top-level data structure 210 (see FIG. 1) to include a direct reference 37 to the manifest 211 (see FIG. 4) as the direct reference of the small object representation. In such examples, the small object metadata comprises manifest 211 for the updated second object 40. In such examples, the updated direct reference 37 is a reference to manifest 211 stored in the bottom-level data structure 226 of the small object representation for updated object 40.

Although the chunks 260 for the updated second object 40 are chunks 260 of container 256 in the example of FIG. 4, in other examples the chunks 260 for the updated second object 40 may be from any of the container(s) of deduplication system 100. Although chunks 201, 203, and 204 are described as example chunks 260 for the updated second object 40, in various examples more or fewer chunks 260 may be used to represent the content of the updated second object 40, and in other examples manifest 211 may include more or fewer references 168 than those illustrated in FIG. 4. In the example of FIG. 4, the illustrated references 168 are references to instances of chunk metadata 150 in the bottom-level data structure 226 (i.e., the bottom-level data structure including manifest 211). In other examples, manifest 211 for the updated second object 40 may comprise references to instances of chunk metadata 150 of multiple different bottom-level data structures of deduplication system 100, and chunks 260 representing the content of updated second object 40 may comprise chunks 260 from any of the containers of deduplication system 100 (that are in the same deduplication domain).

In examples described herein in which the small object metadata comprises a manifest, instructions 122 may select a bottom-level data structure in which to store the manifest from among the bottom-level data structures of the deduplication domain of the deduplication system. Instructions 122 may make the selection in any of a variety of ways. For example, instructions 122 may select a bottom-level data structure to which the manifest has an affinity, or to which the manifest has the greatest affinity among the bottom-level data structures of the deduplication domain, based on one or more suitable measures of affinity.

For example, one measure of affinity between a manifest and a given bottom-level data structure may be the number of references in the manifest to instances of chunk metadata 150 in the given bottom-level data structure. For example, referring to FIG. 4, when all references 168 of manifest 211 are references to chunk metadata 150 in bottom-level data structure 226, instructions 122 may determine that manifest 211 has a greatest affinity to bottom-level data structure 226. In other examples, when references 168 of manifest 211 are to chunk metadata 150 in various different bottom-level data structures of a deduplication domain of deduplication system 100, instructions 122 may determine that manifest 211 has a greatest affinity to one of bottom-level data structures 220, 222, 224, 226, etc., to which it has the most references 168 (i.e., references to instances of chunk metadata 150 in those bottom-level data structures). So, for example, when instructions 122 may determine that manifest 211 has a greatest affinity to one of bottom-level data structures 220, 22, 224, 226, etc., to which it has the most references 168 (i.e., the most references to instances of chunk metadata 150 in that bottom-level data structure). So, for example, when manifest 211 comprises references 168 to instances of chunk metadata 150 in multiple of bottom-level data structures 220, 22, 224, 226, etc., and contains the most references 168 to instances of chunk metadata 150 in bottom-level data structure 226, instructions 122 may determine that bottom-level data structure 226 has the greatest affinity to manifest 211 and based on that select bottom-level data structure 226 for placement of manifest 211. In other examples, when manifest 211 comprises the most references 168 to instances of chunk metadata 150 in another bottom-level data structure (e.g., 224), instructions 122 may determine that the other bottom-level data structure (e.g., 224) has the greatest affinity to manifest 211 and based on that select that other bottom-level data structure (e.g., 224) for placement of manifest 211. In some examples, instructions 122 may consider only the unique references 168 in manifest 211 to make the determination of affinity.

In some examples, instructions 122 may use other measures of affinity, and may base selection of a bottom-level data structure for placement of a manifest based on those measure(s). For example, instructions 122 may the Jaccard Index to determine the similarity between a manifest and each bottom-level data structure in the deduplication domain (or between a manifest and an appropriate candidate subset of the bottom-level data structures in the deduplication domain). For example, instructions 122 may determine that a manifest has a greatest affinity to a given bottom-level data structure having the greatest similarity according to the Jaccard Index measure of similarity among a plurality of bottom-level data structures. In such examples, the Jaccard Index measure of similarity may be used, for example, by comparing a first set representing a given bottom-level data structure and a second set representing a given manifest, where the content of the first set represents the instances of chunk metadata 150 contained by the given bottom-level data structure, and the content of the second set represents the instances of chunk metadata 150 (in respective bottom-level data structures) referenced by references 168 in the given manifest.

In other examples, instructions 122 may use a maximum or minimum identifier technique to determine affinity. For example, instructions 122 may determine a maximum chunk signature ("SIG-X") referenced by manifest 211 and determine that the manifest 211 has an affinity with the bottom-level data structure having that maximum chunk signature. In such examples, instructions 122 may select, for placement of manifest 211, the bottom-level data structure to which manifest 211 is determined to have affinity. In such examples, affinity may be binary (i.e., does or does not have affinity) rather than a measure having additional gradations (e.g., greater or lesser affinity). For example, referring to FIG. 4, instructions 122 may determine, for each reference 168 (or each unique reference 168) in manifest 211, the chunk signature SIG-X in the instance of chunk metadata 150 referenced by the reference 168, and determine the greatest chunk signature among the determined chunk signatures. Instructions 122 may then determine that manifest 211 has affinity to the bottom-level data structure having that greatest chunk signature in one of its instances chunk metadata 150. For example, manifest 211 may contain references 168 to instances of chunk metadata 150 in bottom-level data structures 224 and 226, and instructions 122 may determine that chunk signature SIG-7 is the greatest chunk signature among those referenced (i.e., indirectly) by references 168 and, based on that determination, instructions 122 may determine that manifest 211 has affinity to bottom-level data structure 226 having chunk signature SIG-7 and based on that select bottom-level data structure 226 for placement of manifest 211. In some examples, instructions 122 may use the smallest chunk signature rather than the greatest chunk signature. In other examples, instructions 122 may use identifiers of the bottom-level data structures themselves for determining affinity, rather than the chunk signatures contained by them. For example, instructions 122 may determine, from references 168 of manifest 211, identifiers of the bottom-level data structures referenced by references 168, and may determine that manifest 211 has affinity to the referenced bottom-level data structure with the greatest identifier and based on that select the referenced bottom-level data structure with the greatest identifier for placement of the manifest 211. In other examples, the referenced bottom-level data structure with the smallest identifier may be selected.

In some examples, various measures of affinity may be used in combination. For example, a binary measure of affinity may be used as a tie breaker when a manifest has the same level of affinity by another measure. For example, when instructions 122 determine, based on a measure of similarity (e.g., Jaccard Index, etc.) that manifest 211 has a greatest level of affinity to both bottom-level data structures 224 and 226 (i.e., the same level of affinity to both), then a maximum or minimum chunk signature or a maximum or minimum identifier (as described above), may be used to select between the bottom-level data structures 224 and 226 for placement of the manifest 211. In other examples, ties may be broken in other ways, such as by selecting a latest-referenced bottom-level data structure (in manifest 211) among the tying data structures. In examples described herein, although one or more measures or conditions for measuring affinity may be used (alone or in combination), instructions 122 may utilize a single methodology (e.g., measure or combination of measures) of affinity in making placement decisions in deduplication system 100. In this manner, examples described herein may operate in a manner that gives biases placement decisions such that manifests for duplicative sequences of data may have a greater chance of having the same bottom-level data structure selected for placement, which may provide greater opportunity for deduplicating such manifests, as described below in relation to FIG. 5. In examples described herein, instructions 122 may select a bottom-level data structure in which to place a manifest, as described above, each time there is a new manifest to store (for objects below the threshold size), which may be on initial ingest of a new object or when receiving additional data for a previously ingested object. For example, when new data is received for an object previously stored in deduplication system 100 via a small object representation, instructions 122 may generate a new manifest to represent the updated version of the object, and in such examples instructions 122 may select a bottom-level data structure to store the new manifest for the updated version of the object (when the object remains below the threshold size). In such examples, instructions 122 may perform the selection, as described above, for storage of a manifest when a manifest is created and when a manifest is updated (in examples in which an update to an object involves creation of a new manifest for the updated object).

In some examples, the small object metadata of the small object representation of second object 40 may initially be a manifest 211 as a result of the initial ingest of second object 40. In such examples, rather than second object 40 of FIG. 4 being an updated (and larger) version of a previously stored object 40, second object 40 may be both too large to be stored in one chunk and smaller than the threshold size when initially ingested by deduplication system 100.

In such examples, at the initial reception and processing of second object 40, instructions 122 may determine that second object 40 is both too large to be stored in one chunk and smaller than the threshold size. Based on the determination that second object 40 is smaller than the threshold size, instructions 122 may store a small object representation of second object 40 in deduplication system 100. In such examples, the small object representation may include the content of the second object 40 being contained in a plurality of chunks (e.g., 201, 203, 204, etc.). The chunks of second object 40 may include previously-stored matching chunk(s) (included in the small object representation by referencing the previously-stored chunk(s)), new chunks (for which no match was found) stored based on the ingest of object 40, or a combination thereof.

In such examples, instructions 122 may select a bottom-level data structure in which to store a manifest 211 for second object 40 (e.g., based on affinity as described above). In the example of FIG. 4, instructions 122 may select bottom-level data structure 226 based on suitable measure(s) of affinity between it and manifest 211 and based on the selection may store manifest 211 in bottom-level data structure 226. In such examples, instructions 122 may store, in top-level data structure 210, a direct reference 37 from top-level data structure 210 to manifest 211 in bottom-level data structure 226. In such examples, manifest 211 is the small object metadata of the small object representation of object 40. The direct reference 37 from top-level data structure 210 to manifest 211 omits any intermediate-level data structures separate from and between the top-level and the bottom-level data structures of the small object representation (e.g., chains of references or indirect references to or through intermediate-level data structure(s) to access manifest 211 from top-level data structure 210). In top-level data structure 210, the direct reference 37 may be mapped to ID 30 for second object 40.

In such examples, the small object representation of object 40 may include top-level data structure 210, the direct reference 37 mapped to ID 30 for second object 40, bottom-level data structure 226, the manifest 211 of bottom-level data structure 226, the chunk metadata 150 referenced by manifest 211, and the chunks referenced by that chunk metadata 150. In the example of FIG. 4, the bottom-level data structure 226 of the small object representation includes chunk metadata 150 for the second object 40, including respective storage locations for each chunk of the second object 40. As described above, manifest 211 for second object 40 represents, via references to the chunk metadata 150 of the respective plurality of chunks of second object 40, an order of the plurality of chunks for reconstruction the second object 40.

In some examples, instructions 122 may change the deduplicated representation of object 40 from a small object representation of second object 40 (including a direct reference to small object metadata) to a large object representation of second object 40. In some examples, the deduplicated representation of object 40 may initially be a small object representation including a manifest as the small object metadata (as in the example of FIG. 4), and in other examples the deduplicated representation of object 40 may initially be a small object representation including an instance of chunk metadata 150 as the small object metadata.

For example, referring again to FIG. 4, after storing the small object representation of the second object 40 with additional content 41 in deduplication system 100, instructions 122 may determine that further additional content is to be stored to the deduplicated representation of second object 40 in deduplication system 100. For example, instructions 122 may receive a further updated, larger version of second object 40 for storage (i.e., larger than the version of object 40 including additional content 41). Instructions 122 may determine whether the received and further updated, larger version of second object 40 is greater than the threshold size. If so, instructions 122 may change the small object representation of the second object 40 (including direct reference 37 to manifest 211 of bottom-level data structure 226) to a large object representation of the further updated second object 40. In some examples, the threshold size may be a size at which a given object is too large for the deduplication system 100 to represent all of the chunks of the given object in a single manifest of the deduplication system 100. For example, as described above, a manifest for an object (or portion thereof) may comprise reference(s) to chunk metadata 150 for the chunks 260 of the object (or portion thereof), and instructions 122 may determine that the further updated second object 40 is too large for deduplication system 100 to store all of the references to chunk metadata 150 for the chunks 260 of the further updated second object 40 in a single manifest.

In such examples, the determination of whether the object is less than (or greater than or equal to) the threshold size may be determined indirectly, as described above, based on the size of the manifest for the object in the deduplicated representation. In other examples, the determination may be made directly by comparing the size of the object (without deduplication) to the threshold size, as described above.

To change the deduplicated representation of the object 40 from a small object representation to a large object representation of the further updated version of second object 40, instructions 122 may add one or more intermediate-level data structures to hierarchy 290. The added intermediate-level data structure(s) may be separate from the top-level data structure 210 and the bottom-level data structure 226 of the small object representation of second object 40, and instructions 122 may add them between the top-level data structure 210 and bottom-level data structure 226 in hierarchy 290. In examples herein, being between a first and a second data structure in hierarchy 290 means being lower than one of the data structures and higher than the other.

Referring to the example of FIG. 4, instructions 122 may change the deduplicated representation of object 40 from a small object representation including a manifest 211 in bottom-level data structure 226 to a large object representation of the further updated version of second object 40. In such examples, instructions 122 may update manifest 211 for the second object 40 to represent a reconstruction order for the chunks of the second object with the additional content 41 and the further additional content. In such examples, references to instances of chunk metadata 150 for chunks representing the further additional content of object 40 may be added to manifest 211. The chunks representing the further additional content may include previously-stored matching chunk(s), new chunks (for which no match was found) added to the deduplication system 100, or a combination thereof.

Instructions may store the updated manifest 211 in the one or more added intermediate-level data structures. For example, instructions 122 may store manifest 211 in a new intermediate-level data structure (e.g., like data structure 216) below another intermediate-level data structure (e.g., like data structure 212), both of which are below top-level data structure 210 in hierarchy 290. In other examples, instructions 122 may divide the updated manifest 211 into respective manifests for separate portions of the further updated second object 40, and store each of the respective manifests for the portions in a respective one of the added intermediate-level data structures (e.g., like the respective manifests 160 and 164 of intermediate-level data structures 214 and 216 as described above). Instructions 122 may update the direct reference 37 with a reference to the added one or more intermediate-level data structures. For example, the updated direct reference may reference an added intermediate-level data structure (e.g., like data structure 212) that is above and that references each of the other added intermediate-level data structure(s) (e.g., as with data structures 212, 214, and 216).

In some examples, deduplication system 100 may initially store a small object representation of object 40 including chunk metadata 150 as the small object metadata, later transition the small object metadata to a manifest 211, and later change the small object representation including manifest 211 to a large object representation, as described above. In other examples, deduplication system 100 may initially store a small object representation of object 40 including manifest 211 as the small object metadata, and later change the small object representation including manifest 211 to a large object representation, as described above.

In other examples, instructions 122 may change the deduplicated representation of object 40 from a small object representation, including an instance of chunk metadata 150 as the small object metadata, to a large object representation of an updated version of second object 40. For example, referring to FIG. 1, after storing an initial small object representation of object 40, including an instance of chunk metadata 150 as the small object metadata, instructions 122 may receive an updated version of object 40, including additional content, and may store a manifest for the updated second object 40 with the additional content. In some examples, instructions 122 may determine that, with the additional content, the updated second object 40 is greater than the threshold size.

In such examples, instructions 122 may generate a manifest for the updated second object 40 to represent a reconstruction order for the chunks of the updated second object 40 with the additional content, may add one or more intermediate-level data structures separate from and between the top-level and bottom-level data structures of the small object representation of object 40 (as described above in relation to FIG. 4), and may store the generated manifest in one or more of the added intermediate-level data structures (as described above in relation to FIG. 4). In such examples, instructions 122 may update the direct reference of the small object representation with a reference to the added one or more intermediate-level data structures, as described above in relation to FIG. 4.

Although examples of transitioning between types of small object metadata and between small and large object representations are described herein in the context of deduplication system 100 receiving updated (larger) versions of an object, deduplication system 100 may perform similar functionalities in other contexts. For example, instructions 122, during ingest of an object, may initially determine to store the object using a small object representation and transition to a large object representation before when the amount of data for the object being ingested exceeds the threshold size. Instructions 122 may similarly transition from an instance of chunk metadata 150 as small object metadata to a manifest as small object metadata for an object as more data for a single object is ingested during an ingest process.

Further examples are described herein in relation to FIG. 5. FIG. 5 is a block diagram of an example deduplication system 100 to deduplicate manifests. The deduplication system 100 of FIG. 5 is the same as the deduplication system 100 of FIGS. 1 and 4, although the example of FIG. 5 illustrates some different functionalities of deduplication system 100 than the examples of FIGS. 1 and 4.

In the example of FIG. 5, deduplication system 100 may store a large object representation of a first object 10 associated with ID 20 (as described above in relation to FIG. 1) and may store a small object representation of a second object 40 associated with ID 30 including a manifest 211 as small object metadata in bottom-level data structure 226 (as described above in relation to FIG. 4). Manifest 211 comprises references 168 to chunk metadata 150 for each chunk of the second object 40. Each instance of chunk metadata 150 referenced by manifest 211 comprises a chunk signature (e.g., SIG-2, SIG-4, SIG-7, etc., in FIG. 5). For each instance of chunk metadata 150, the chunk signature of that instance of chunk metadata 150 represents the content of the chunk 260 associated with that instance of chunk metadata 150.

In the example of FIG. 5, instructions 122 may generate a manifest signature 169 ("SIG-11") for the second object 40 based on each of the chunk signatures of the chunk metadata 150 referenced by the manifest 211 for the second object 40 (e.g., based on each of the chunk signatures of the chunk metadata 150 for each chunk 260 of the second object 40). Instructions 122 may store the manifest signature 169 in a bottom-level data structure (e.g., 226) of the small object representation of second object 40. For example, instructions 122 may store manifest signature 169 in the manifest 211 of bottom-level data structure 226.

In some examples, instructions 122 may determine the manifest signature 169 by applying a signature function (e.g., hash function, etc.), as described above, to the chunk signatures for the chunks 260 of second object 40, which are contained in the instances of chunk metadata 150 referenced by manifest 211. In the example of FIG. 5, the second object 40 may be represented in deduplication system 100 by a collection of chunks referenced (via chunk metadata) by manifest 211, including, for example, chunks 201, 203, and 204 (at least).

Manifest 211 may refer to each of these chunks via references to instances of chunk metadata 150 associated with those chunks. For example, manifest 211 includes a reference 168 to chunk metadata 150 having ID 272 that is associated with chunk 204, a reference 168 to chunk metadata 150 having ID 270 that is associated with chunk 203, and a reference 168 to chunk metadata 150 having ID 249 that is associated with chunk 201. These instances of chunk metadata each include a chunk signature (e.g., SIG-7, SIG-4, and SIG-2), and instructions 122 may determine the manifest signature 169 based on these chunk signatures in the chunk metadata 150 referenced by manifest 211. For example, instructions 122 may concatenate all of the chunk signatures of the instances of chunk metadata 150 referenced by manifest 211 (e.g., chunk signatures SIG-7, SIG-4, SIG-2, etc.) and then apply the signature function to the result of the concatenation to generate manifest signature 169. In other examples, the manifest signature may be generated in any other suitable manner (e.g., based on the chunk signatures). Although the example of FIG. 5 was described in relation to three illustrated references 168 to chunk metadata, in other examples manifest 211 may include more or fewer references 168 and correspondingly more or fewer chunk signatures to generate manifest signature 169.

Continuing the example of FIG. 5, instructions 122 may receive a third object 60 for storage (in deduplication system 100) via a deduplicated representation including a plurality of chunks to represent the content of third object 60. In some examples, instructions 122 may generate a manifest for the third object 60, may determine that the third object 60 is below the threshold size and, based on that determination, may generate a manifest signature for the third object 60 based on each of the chunk signatures of the chunk metadata referenced by the manifest of third object 60 (e.g., as described above in relation to manifest signature 169).

For example, the manifest for the third object 60 comprises, for each chunk 260 of the third object 60, a reference to a respective instance of chunk metadata 150 that includes a chunk signature representing the content of the associated chunk 260, and instructions 122 may generate the manifest signature for the third object 60 based on each of those chunk signatures. In some examples, the chunks 260 representing content of third object 60 may already be stored in deduplication system 100, may be added during the ingest process for third object 60, or a combination thereof.

In some examples, instructions 122 may select a bottom-level data structure in which to store the manifest for the third object 60, as described above. In the example of FIG. 5, instructions 122 may select bottom-level data structure 226 for storage of the manifest. In such examples, before storing the manifest for third object 60, instructions 122 may compare the manifest signature for the third object 60 to the manifest signature 169 for the second object 40. Based on a determination that the manifest signature 169 for the second object is equivalent to the manifest signature for the third object 60, instructions 122 may store (in deduplication system 100) a small object representation of the third object 60 including a direct reference 55 from top-level data structure 210 to the manifest 211 for the second object 40 in bottom-level data structure 226.

In such examples, instructions 122 may perform deduplication at the manifest level. In such examples, before storing a new manifest for third object 60, instructions 122 may use respective manifest signatures to determine whether an equivalent manifest is already stored in deduplication system 100, as in the example of FIG. 5. When an equivalent manifest is already stored in deduplication system 100, a reference (e.g., 55) to the already stored manifest may be stored in deduplication system 100 instead of a duplicate of the manifest. In the example of FIG. 5, a small object ID 50 associated with the third object 60 may be stored in top-level data structure 210 and may be mapped to the reference 55 to the already-stored manifest 211. In such examples, instructions 122 may store a small object representation of the third object 60 including the direct reference 55 from the top-level data structure 210 to the manifest for the second object in the bottom-level data structure. In examples described herein, selecting a bottom-level data structure for storage of a manifest based on one or more measures of affinity, as described above, may cause instructions 122 to select the same bottom-level data structure for two identical manifests, enabling them to be deduplicated as described above. In such examples, using uniform placement selection criteria is expected to give the same placement decisions for identical manifest data, for example.

As used herein, a "computing device" may be a server, storage device, storage array, backup appliance, desktop or laptop computer, switch, router, or any other processing device or equipment including at least one processing resource. In examples described herein, a processing resource may include, for example, one processor or multiple processors included in a single computing device or distributed across multiple computing devices. As used herein, a processor may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution of instructions stored on a machine-readable storage medium, or a combination thereof. In examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the examples illustrated herein, a storage medium 120 may be implemented by one machine-readable storage medium, or multiple machine-readable storage media.

In examples described herein, a backup appliance, storage array, or the like, may be a computing device comprising a plurality of storage devices and one or more controllers to interact with client (or host) devices and control access to the storage devices. In some examples, the storage devices may include hard disk drives (HDDs), solid state drives (SSDs), or any other suitable type of storage device, or any combination thereof. In some examples, the controller(s) may virtualize the storage capacity provided by the storage devices to enable a host to access a virtual object (e.g., a volume) made up of storage space from multiple different storage devices.

As used herein, a "machine-readable storage medium" may be any electronic, magnetic, optical, or other physical storage apparatus to contain or store information such as executable instructions, data, and the like. For example, any machine-readable storage medium described herein may be any of RAM, EEPROM, volatile memory, non-volatile memory, persistent memory, persistent storage, flash memory, a storage drive (e.g., an HDD, an SSD), any type of storage disc (e.g., a compact disc, a DVD, etc.), or the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components. In some examples, instructions may be part of an installation package that, when installed, may be executed by a processing resource to implement functionalities described herein.

In examples described herein, the phrase "based on" is inclusive and means the same as the alternative phrasing "based at least on" or "based at least in part on". In examples described herein, functionalities described as being performed by "instructions" may be understood as functionalities that may be performed by those instructions when executed by a processing resource. In other examples, functionalities described in relation to instructions may be implemented by one or more engines, which may be any combination of hardware and programming to implement the functionalities of the engine(s).

What is claimed is:

1. A method comprising:
   storing, in a deduplication system, a large object representation of a first object that is greater than a threshold size, wherein the large object representation comprises metadata organized in a hierarchy of data structures including:
   a top-level data structure;
   one or more bottom-level data structures, each comprising chunk metadata including storage locations for respective chunks of the first object; and
   one or more intermediate-level data structures, separate from and between the top-level and bottom-level data structures in the hierarchy, comprising a manifest representing, via references to the chunk metadata of the one or more bottom-level data structures, a reconstruction order for the chunks of the first object;
   determining that a second object is smaller than the threshold size; and
   based on the determination, storing, in the deduplication system, a small object representation of the second object comprising:
   a direct reference from the top-level data structure to small object metadata in a bottom-level data structure of the small object representation, the direct reference omitting any intermediate-level data structures separate from and between the top-level and the bottom-level data structures of the small object representation,
   wherein the bottom-level data structure of the small object representation includes chunk metadata for the second object including a respective storage location for each chunk of the second object.

2. The method of claim 1, wherein:
   the content of the second object is contained in a single chunk;
   the small object metadata comprises the chunk metadata for the single chunk of the second object; and
   the direct reference comprises a reference, stored in the top-level data structure, to the chunk metadata for the single chunk of the second object.

3. The method of claim 1, wherein:
   the content of the second object is contained in a plurality of chunks;
   the small object metadata comprises a manifest for the second object stored in the bottom-level data structure of the small object representation; and
   the manifest for the second object represents, via references to the chunk metadata of the respective plurality of chunks of the second object, an order of the plurality of chunks for reconstruction the second object.

4. The method of claim 3, wherein:
   a deduplication domain of the deduplication system comprises a plurality of bottom-level data structures, including the one or more bottom-level data structures of the large object representation; and
   storing the small object representation of the second object in the deduplication system comprises:
   selecting a given bottom-level data structure of the plurality of bottom-level data structures as the bottom-level data structure of the small object representation and to store the manifest based on an affinity between the manifest and the given bottom-level data structure.

5. The method of claim 4, wherein, for each chunk of the second object, the respective chunk metadata comprises a chunk signature representing the content of the chunk, the method further comprising:
   generating a manifest signature for the second object based on each of the chunk signatures of the chunk metadata referenced by the manifest of the second object; and
   storing the manifest signature in the bottom-level data structure of the small object representation.

6. The method of claim 5, further comprising:
   generating a manifest for the third object comprising, for each chunk of the third object, a reference to respective chunk metadata including a chunk signature representing the content of the chunk; and
   based on a determination that a third object is below the threshold size and comprises content to be represented by a second plurality of chunks:
   generating a manifest signature for the third object based on each of the chunk signatures of the chunk metadata referenced by the manifest of the third object.

7. The method of claim 6, further comprising:
   comparing the manifest signature for the third object to the manifest signature for the second object; and
   based on a determination that the manifest signatures for the second and third objects are equivalent, storing, in the deduplication system, a small object representation of the third object including a direct reference from the top-level data structure to the manifest for the second object in the bottom-level data structure.

8. An article comprising a non-transitory machine-readable storage medium comprising instructions executable at least one processing resource to:

based on a determination that a first object is greater than a threshold size, store a large object representation of the first object in a deduplication system, the large object representation comprising metadata organized in a hierarchy of data structures including:
a top-level data structure;
one or more bottom-level data structures, each comprising chunk metadata including storage locations for respective chunks of the first object;
one or more intermediate-level data structures, separate from and between the top-level and bottom-level data structures in the hierarchy, comprising a manifest representing, via references to chunk metadata of the one or more bottom-level data structures, a reconstruction order for the chunks of the first object; and
wherein the one or more intermediate-level data structures are separate from the top-level and bottom-level data structures and between them in a data structure hierarchy; and
based on a determination that a second object is smaller than the threshold size, store, in the deduplication system, a small object representation of the second object comprising:
a direct reference from the top-level data structure to small object metadata in a bottom-level data structure of the small object representation, the direct reference omitting any intermediate-level data structures separate from and between the top-level and bottom-level data structures of the small object representation,
wherein the bottom-level data structure of the small object representation includes chunk metadata for each chunk of the second object including a respective storage location for each chunk of the second object.

9. The article of claim 8, the instructions executable to:
based on a determination that the content of the second object is small enough to be represented in the deduplication system by a single chunk:
store, in the top-level data structure, a reference to the chunk metadata for the single chunk of the second object, wherein the chunk metadata for the single chunk is stored in the bottom-level data structure of the small object representation;
wherein the direct reference comprises the reference to the chunk metadata for the single chunk.

10. The article of claim 9, the instructions executable to:
after storing the small object representation of the second object in the deduplication system, determine that additional content is to be stored to the deduplicated representation of the second object in the deduplication system;
based on a determination that the content of the second object with the additional content is too large to be stored in one chunk and is smaller than the threshold size:
store a manifest for the second object with the additional content in the bottom-level data structure of the small object representation, wherein the manifest for the second object represents, via references to chunk metadata, a reconstruction order of a first plurality of chunks containing the content of the second object; and
modify the top-level data structure of the small object representation to include a reference to the manifest for the second object in the bottom-level data structure of the small object representation as the direct reference.

11. The article of claim 10, the instructions executable to:
after storing the small object representation of the second object with the additional content in the deduplication system, determine that further additional content is to be stored to the deduplicated representation of the second object in the deduplication system;
based on a determination that the content of the second object with the further additional content is greater than the threshold size, change the small object representation of the second object to a large object representation of the second object;
the instructions to change comprising instructions to:
add one or more intermediate-level data structures separate from the top-level and bottom-level data structures of the small object representation and between them in a data structure hierarchy;
update the manifest for the second object to represent a reconstruction order for the chunks of the second object with the additional content and the further additional content; and
store the updated manifest in the one or more intermediate-level data structures; and
update the direct reference with a reference to the added one or more intermediate-level data structures.

12. The article of claim 8, the instructions executable to:
based on a determination that the content of the second object is not small enough to be represented in the deduplication system by a single chunk:
store a manifest for the second object in the bottom-level data structure of the small object representation, wherein the manifest for the second object represents, via references to chunk metadata, a reconstruction order of a first plurality of chunks containing the content of the second object; and
store, in the top-level data structure of the small object representation and as the direct reference, a reference to the manifest for the second object in the bottom-level data structure of the small object representation.

13. The article of claim 12, the instructions executable to:
after storing the small object representation of the second object in the deduplication system, determine that additional content is to be stored to the deduplicated representation of the second object in the deduplication system;
based on a determination that the content of the second object with the additional content is greater than the threshold size, change the small object representation of the second object to a large object representation of the second object;
the instructions to change comprising instructions to:
add one or more intermediate-level data structures separate from the top-level and bottom-level data structures of the small object representation and between them in a data structure hierarchy;
update the manifest for the second object to represent a reconstruction order for the chunks of the second object with the additional content;
store the updated manifest in the one or more intermediate-level data structures; and
update the direct reference with a reference to the added one or more intermediate-level data structures.

14. A computing device comprising:
at least one processing resource; and
a non-transitory machine-readable storage medium comprising instructions executable by the at least one processing resource to:
store, in a deduplication system, a large object representation of a first object that is greater than a threshold size, the large object representation comprising metadata organized in a hierarchy of data structures including:
a top-level data structure;
one or more bottom-level data structures, each comprising chunk metadata including storage locations for respective chunks of the first object; and
one or more intermediate-level data structures, separate from and between the top-level and bottom-level data structures in the hierarchy, comprising a manifest representing a reconstruction order for the chunks of the first object via references to chunk metadata of the one or more bottom-level data structures;
determining that a second object is smaller than the threshold size; and
based on the determination, storing, in the deduplication system, a small object representation of the second object comprising:
a direct reference from the top-level data structure to small object metadata in a bottom-level data structure of the small object representation, the direct reference omitting any intermediate-level data structures separate from and between the top-level and the bottom-level data structures of the small object representation,
wherein the bottom-level data structure of the small object representation includes chunk metadata for the second object that includes a respective storage location for each chunk of the second object.

15. The computing device of claim 14, wherein:
the content of the second object is contained in a single chunk;
the small object metadata comprises the chunk metadata for the single chunk of the second object;
the direct reference comprises a reference to the chunk metadata for the single chunk of the second object in the bottom-level data structure of the small object representation; and
the direct reference is stored in the top-level data structure of the small object representation.

16. The computing device of claim 14, wherein:
the content of the second object is contained in a plurality of chunks;
the small object metadata comprises a manifest for the second object stored in the bottom-level data structure of the small object representation; and
the manifest for the second object represents a reconstruction order for the plurality of chunks for the second object via references to the chunk metadata of the plurality of chunks of the second object.

17. The computing device of claim 16, wherein the manifest for the second object comprises references to chunk metadata of multiple different bottom-level data structures of the deduplication system.

18. The computing device of claim 17, wherein, for each chunk of the second object, the respective chunk metadata comprises a chunk signature representing the content of the chunk, the method further comprising:
generating a manifest signature for the second object based on each of the chunk signatures of the chunk metadata referenced by the manifest for the second object; and
storing the manifest signature in the bottom-level data structure of the small object representation.

19. The computing device of claim 18, further comprising:
generating a manifest for the third object comprising, for each chunk of the third object, a reference to respective chunk metadata including a chunk signature representing the content of the chunk; and
based on a determination that a third object is below the threshold size and comprises content to be represented by a second plurality of chunks:
generating a manifest signature for the third object based on each of the chunk signatures of the chunk metadata referenced by the manifest of the third object.

20. The computing device of claim 19, further comprising:
comparing the manifest signature for the third object to the manifest signature for the second object; and
based on a determination that the manifest signatures for the second and third objects are equivalent, storing, in the deduplication system, a small object representation of the third object including a direct reference from the top-level data structure to the manifest for the second object in the bottom-level data structure.

* * * * *